United States Patent [19]

Tolksdorf et al.

[11] Patent Number: 4,707,058
[45] Date of Patent: Nov. 17, 1987

[54] PLANAR OPTICAL WAVEGUIDE AND PROCESS FOR ITS MANUFACTURE

[75] Inventors: Wolfgang F. M. Tolksdorf, Tornesch; Inske E. H. Bartels, Pinneberg; Elke B. Pross, Hamburg, all of Fed. Rep. of Germany

[73] Assignee: U.S. Philips Corporation, New York, N.Y.

[21] Appl. No.: 775,551

[22] Filed: Sep. 13, 1985

[30] Foreign Application Priority Data

Sep. 21, 1984 [DE] Fed. Rep. of Germany ....... 3434631

[51] Int. Cl.$^4$ ............................................. G02B 6/10
[52] U.S. Cl. ............................ 350/96.12; 350/96.34
[58] Field of Search .............. 350/96.11, 96.12, 96.13, 350/96.34

[56] References Cited

U.S. PATENT DOCUMENTS 3,995,936  12/1976  Hepner et al. .................... 350/96.12
4,236,782  12/1980  Castera et al. ................ 350/96.12 X

OTHER PUBLICATIONS

Okamura, Y., et al. "Y-Branch Interferometer in YIG Film Grown by Liquid Phase Epitaxy." Applied Optics, vol. 23, No. 14, pp. 2420-2422 (Jul. 15, 1984).
Pistore, J., et al. "Mode Spectroscopy of Double-Layer Magnetic Garnet Films." *IEEE Trans. on Magnetics*, vol. MAG-20, No. 5, pp. 1057-1059 (Sep. 1984).
Shibukawa, A., et al, "Optical TE-TM Mode Conversion in Double Epitaxial Garnet Waveguide." Applied Optics, vol. 20, No. 14, pp. 2444-2450 (Jul. 15, 1981).
Tolksdorf, W., et al "Compositional Inhomogeneities Along the Growth Direction of Substituted Yttrium Iron Garnet Epilayers." Journal of Crystal Growth, vol. 52, pp. 722-728 (1981).

*Primary Examiner*—Eugene R. LaRoche
*Assistant Examiner*—Steven J. Mottola
*Attorney, Agent, or Firm*—Marc D. Schechter

[57] ABSTRACT

Planar optical waveguide comprising a nonmagnetic substrate with a first magnetooptical layer produced epitaxially on the substrate, and a second magnetooptical layer produced epitaxially on the first magnetooptical layer. Both magnetooptical layers are composed of an iron garnet-based material. The second magnetooptical layer has a refractive index n which is approximately $1 \times 10^{-3}$ to $1 \times 10^{-2}$ greater than the refractive index of the first magnetooptical layer. The material of the magnetooptical layers contains at least one substituent at the dodecahedral sites of the garnet lattice, in particular lead. The proportions of lead are different in the materials of the first and the second magnetooptical layer. The optical waveguide can be used for optical single mode waveguides in the near infrared spectral range ($0.8 \leq \lambda \leq 1.6$ μm).

15 Claims, 2 Drawing Figures

PLANAR OPTICAL WAVEGUIDE AND PROCESS FOR ITS MANUFACTURE

BACKGROUND OF THE INVENTION

The invention relates to a planar optical waveguide. The waveguide comprises a nonmagnetic substrate with a first magnetooptical layer provided expitaxially on the substrate. A second magnetooptical layer is provided expitaxially on the first magnetooptical layer. Both magnetooptical layers consist of an iron garnet-based material.

The invention further relates to a process for manufacturing such an optical waveguide.

In optical communication by means of glass optical fibers, single mode waveguides are used as optical isolators or possibly also as optical circulators to protect the semiconductor laser diodes used therein from light reflected back from the coupled section. Such waveguides utilize the nonreciprocal properties of magnetooptical materials based of the Faraday effect. Planar optical single mode waveguides formed by layers of magnetooptical material provided epitaxially on a substrate must have a radiation-conducting layer with a thickness which corresponds to the dimensions of the optical fibers to be coupled; monomode optical fibers, for example, have core diameters in the region of 5 to 10 $\mu$m, meaning that the thickness of the radiation-conducting layer of a monomode waveguide must also lie in the region of 5 to 10 $\mu$m.

Layers with these dimensions can be made from highly diluted molten solutions via liquid phase epitaxy (LPE), where the solvent usually consists of a mixture of PbO and $B_2O_3$. A suitable material for the magnetooptical layer is, for example, yttrium-iron garnet ($Y_3Fe_5O_{12}$). For the substrate, on which such layers grow epitaxially, a suitable material is gadolinium-gallium garnet ($Gd_3Ga_5O_{12}$) in the form of the 0.5 mm thick (111) single-crystal slice (which is commercially available). Other iron garnets are also suitable for the magnetooptical layers, such as, for example, $Gd_3Fe_5O_{12}$ or bismuth-substituted iron garnets.

It is known to grow two iron garnet layers of different compositions consecutively on such single-crystal substrate slices in two separate epitaxial processes from two different melts. J. Pistora et al describe in an article entitled "Mode Spectroscopy of Double-Layer Magnetic Garnet Films" (IEEE Transactions on Magnetics, Vol. MAG-20, No. 5, pages 1057–1059, September, 1984) how a Sm- or Ga-substituted yttrium-iron garnet layer, 0.8 $\mu$mm thick with a refractive index $n_1 = 2.18 \pm 0.02$ is produced epitaxially from a melt on a substrate. They also describe how subsequently a second epitaxial layer with a thickness of 1.5 $\mu$m and a refractive index $n_2 = 2.30 \pm 0.02$ is produced from nominally unsubstituted yttrium-iron garnet.

The following disadvantages are connected with this known layer structure:

In optical communication by means of optical fibers, monomode transmission is used for obtaining a high data rate. Due to the wide difference in refractive index $\Delta n = n_2 - n_1 = 0.12$ of the known layer structure, monomode data transmission is not possible; only multimode data transmission is possible.

Further disadvantages of the known waveguide are that two different melts have to be used for the manufacture of the magnetooptical layers, so that two separate working processes are therefore required. The setting of the differene in refractive index $\Delta n$ between the two magnetooptical layers is highly inaccurate.

A further disadvantage of the known layer is that a transient layer is produced between the two iron garnet layers ($Y_3(Fe,Ga)_5O_{12}$ and $Y_3Fe_5O_{12}$) as a result of the second epitaxial process. The transient layer has a different composition and consequently also a different refractive index.

SUMMARY OF THE INVENTION

It is an object of the invention to provide a planar optical waveguide which is suitable for monomode data transmission and which can be produced very simply in one working process by producing two magnetooptical layers with a very slight difference in refractive index.

This object is achieved according to the invention by including in the materials of the magnetooptical layers at least one substituent at the dodecahedral sites of the garnet lattice. The proportions of the substituents differ in the materials for the first and for the second magnetooptical layers. The second magnetooptical layer has a refractive index n which is approximately $1 \times 10^{-3}$ to $1 \times 10^{-2}$ greater than the refractive index of the first magnetooptical layer.

In a method of manufacturing such a single mode waveguide, two magnetooptical layers with a difference in refractive index $\Delta n$ in the region of $1 \times 10^{-3}$ to $1 \times 10^{-2}$ are deposited epitaxially on the substrate from the same melt. The incorporation of the ions which modify the refractive indices is controlled by changing the speed of rotation of the substrate in the melt while simultanuously supercooling the melt.

According to an advantageous aspect of the invention the material for the magnetooptical layers has a composition described by the formula $Y_{3-x}Pb_xFe_5O_{12}$, where $x = 0.007$ to $0.025$ for the first magnetooptical layer directly on the substrate, and where $x = 0.02$ to $0.05$ for the second magnetooptical layer provided on the first magnetooptical layer.

The waveguide according to the invention can therefore be used to manufacture an optical single mode waveguide, in particular in the near infrared spectral range $0.8 \leq \lambda \leq 1.6$ $\mu$m.

The invention is based on the knowledge that the incorporation in an iron garnet layer of the ions which modify the refractive index, both as regards ions incorporated at the dodecahedral sites (e.g. Pb and/or Bi) and also ions incorporated at the octahedral site (e.g. Ga) can only be controlled by the speed of rotation of the substrate in the melt with simultaneous supercooling of the melt. At an increased rotation of the substrate an increased Pb proportion is, for example, incorporated in the layer. At the same time, the Ga proportion (in the case of, for example, Ga-doped iron garnet melts) is reduced. Both lead to an increase in the refractive index of the epitaxial layer.

The advantages achieved with the invention are that the difference in refractive index $\Delta n$ between the two expitaxial magnetooptical layers can only be set very accurately within the range of minimum deviation by the epitaxial conditions. Also, the process for growing these epitaxial magnetooptical layers with a different refractive index, and thus a different composition, can be conducted without interruption and from the same melt.

As thin epitaxial layers (e.g. of yttrium-iron garnet) are generally manufactured from highly diluted molten solutions with a PbO and B$_2$O$_3$ solvent, it was considered appropriate to study the incorporation of Pb as a refractive index-modifying ion with the aid of different speeds of rotation. The manufacture of different magnetooptical layers of the composition Y$_{3-x}$Pb$_x$Fe$_5$O$_{12}$ is therefore described as an example of an embodiment of the invention.

It should be observed thereby that, although a PbO and B$_2$O$_3$ solvent is used, the boron contained in the growing layer is so minimal that it can be disregarded.

BRIEF DESCRIPTION OF THE INVENTION

DESCRIPTION OF THE PREFERRED EMBODIMENTS

Figure 1:
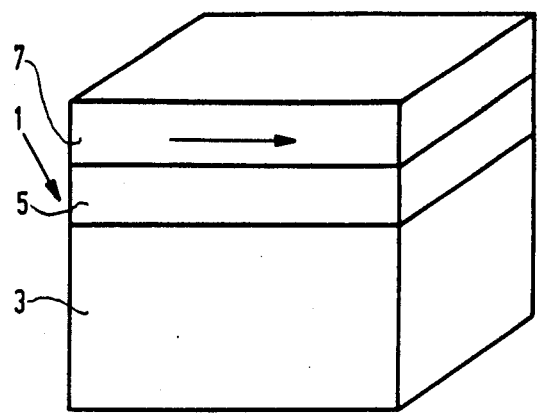
FIG. 1 is a perspective view of a planar optical one-way waveguide according to the invention.

FIG. 1 represents a planar optical waveguide 1 comprising a substrate 3 of Gd$_3$Ga$_5$O$_{12}$. The substrate consists of a 500 μm thick (111)-oriented single-crystal slice.

The first magnetooptical layer 5 is an epitaxial Y$_{3-x}$Pb$_x$Fe$_5$O$_{12}$ layer, where x=0.0007 to 0.025. The layer 5 has a refractive index n$_1$ in the region 2.2109 to 2.2203.

The second magnetooptical layer 7 is an epitaxial Y$_{3-x}$Pb$_x$Fe$_5$O$_{12}$ layer, where x=0.02 to 0.04. The layer 7 has a refractive index n$_2$ in the region of 2.2155 to 2.2250. The difference in refractive index Δn=n$_2$−n$_1$ thereby lies in the region of 1.8 to 4.7×10$^{-3}$.

The magnetooptical layers 5 and 7 were produced by the liquid phase epitaxial process described, for example, in an article by W. Tolksdorf et al entitled "Compositional Inhomogeneities Along The Growth Direction of Substituted Yttrium Iron Garnet Epilayers" (J. Crystal Growth, Vol. 52 (1981), pages 722 to 728). Horizontally supported 0.5 mm thick (111)-oriented Gd$_3$Ga$_5$O$_{12}$ single-crystal slices measuring 30 mm in diameter were used as substrates. For the production of the magnetooptical layers 5 and 7 either a Melt I or a Melt II was used. The compositions of the melts (by the proportions of cations in the melt) are shown in the following Table 1.

The Melts I and II had the following compositions in terms to the oxides used (in % by weight):

TABLE 1

|  | Melt I | Melt II |
|---|---|---|
| PbO | 90.88 | 87.14 |
| B$_2$O$_3$ | 1.99 | 3.40 |
| Fe$_2$O$_3$ | 6.46 | 8.70 |
| Y$_2$O$_3$ | 0.67 | 0.76 |
|  | 100.00 | 100.00 |

| | Melt composition Proportions of cations in the melt (atomic %) | |
|---|---|---|
| Cations | Melt I | Melt II |
| Pb | 73.874 | 64.663 |
| B | 10.372 | 16.176 |
| Fe | 14.678 | 18.046 |
| Y | 1.077 | 1.115 |

Double layers No. 1 to No. 3 with differing compositions and consequently differing indices n$_1$ and n$_2$ were produced from the Melts I and II under the conditions specified in Table 2.

TABLE 2

|  | Double layer No. 1 from Melt I (T$_s$ = 931° C.) | | Double layer No. 2 from Melt I (T$_s$ = 931° C.) | | Double layer No. 3 from Melt II (T$_s$ = 925° C.) | |
|---|---|---|---|---|---|---|
|  | Bottom layer | Top layer | Bottom layer | Top layer | Bottom layer | Top layer |
| ΔT [K] | 43 | 43 | 7 | 41 | 58 | 58 |
| ω [min$^{-1}$] | 30 | 160 | 60 | 160 | 30 | 160 |
| d [μm] | 4.6 | 4.6 | 4.8 | 6.1 | 3.0 | 6.2 |
| x Pb | 0.01 | 0.02 | 0.007 | 0.03 | 0.025 | 0.04 |
| n | 2.2137 | 2.2155 | 2.2109 | 2.2155 | 2.2203 | 2.2250 |
| Δn = n$_2$−n$_1$ | 1.8 · 10$^{-3}$ | | 4.6 · 10$^{-3}$ | | 4.7 · 10$^{-3}$ | |

T$_s$ = Saturation temperature of the melt.
n = Refractive index, measured at identically produced individual layers.
ΔT = Supercooling of the melt.
ω = Rate of rotation of the substrate in the melt
d = Layer thickness.
x Pb = Pb content in formula units.
Δn = Difference in refractive index between the first (bottom layer) and the second (top layer) magneto-optical layer.

The double layer No. 1 was produced from the Melt I with the composition indicated in Table 1 under the experimental conditions indicated in Table 2. The refractive index difference was Δn=1.8×10$^{-3}$.

Figure 2:
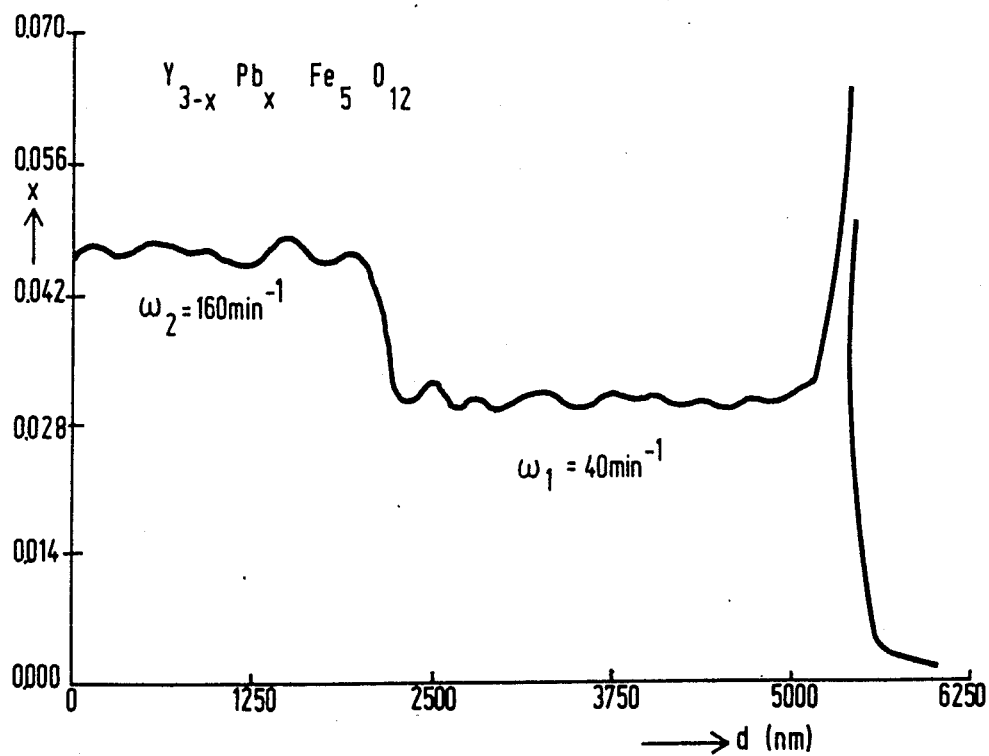
FIG. 2 is a graph of the Pb content (x) of Y$_{3-x}$Pb$_x$Fe$_5$O$_{12}$ garnet layers at two different speeds of rotation of the substrate (w$_1$ and w$_2$) as a function of the distance (d) from the surface of a substrate.

The raising of the Pb content, and thus the raising of the refractive index from n$_1$ to n$_2$ as a result of raising the speed of rotation ω occurs in a layer zone which is smaller than 0.2 μm. This was measured with a lead depth profile analysis as described in the article by W. Tolksdorf et al. (secondary iron mass spectrometry SIMS). The measurement was made on a double layer produced from an identical melt. With this double layer the supercooling was ΔT=51K, the speed of rotation for the first magnetooptical layer produced directly on the substrate was ω$_1$=40 min$^{-1}$, and the speed of rotation for the second magnetooptical layer was ω$_2$=160 min$^{-1}$. The result is shown in FIG. 2. A transient zone rich in lead can be clearly detected at a depth of 5100 nm, as always occurs with these melts at the beginning of the epitaxial process. In this case, therefore, the lead-rich zone is located directly at the gadolinium gallium garnet substrate.

If the narrow inhomogenous zone between the two epitaxial layers is taken into account, the jump in refractive index in a two-stage epitaxial process can be further increased through the selection of different supercoolings ΔT for the two magnetooptical layers. The experimental conditions and the results for a double layer produced in this manner (double layer No. 2) from Melt I are summarized in Table 2. Despite the transient zone between bottom layer and top layer, monomode transmission could be achieved in the top layer. An increase of $\Delta T$ without interrupting the epitaxial process and without increasing the speed of rotation, such as is possible for a single-stage uninterrupted epitaxial process simply through an increase of the speed of rotation, is out of the question due to the high thermal time constants of the system.

The difference in Pb content, which leads to the desired difference in refractive index $\Delta n$, can be influenced not only by the epitaxial conditions but also by the composition of the melt. The ratio of Pb:B plays an essential role.

Whereas in Melt I the molar ratio was $R_1=Pb:B=7.1$, Melt II (see Table 1) was richer in boron with $R_1=4.0$; at the same time, however, the cation fractions of Fe and Y were increased, whereby their ratio $R_3=Fe:Y$ also increased to 16.2 Since the absolute incorporation of lead is greater for Melt II than for Melt I under comparable conditions, a higher value $\Delta n$ can thereby also be obtained by increasing the speed of rotation, as indicated by the data for the double layer No. 3 in Table 2. With $\Delta n = 4.7 \times 10^{-3}$ the top layer was also a monomode waveguide in this case.

The parameters which modify the refractive index difference between the two magnetooptical layers in the most efficient manner, in order to produce a certain required optical waveguide, can be selected by the expert in each individual case. By simultaneous incorporation of, for example, gallium or aluminum in addition to lead in the iron garnet layers, the difference in refractive index can be increased even further. An increase in the speed of rotation of the substrate in the melt, and also an increase in the supercooling of the melt, produce a reduction in the incorporation of gallium and/or aluminum at the octahedral sites and thus an increase in the refractive index. (See, for example, the article by W. Talksdorf et al.).

What is claimed is:

1. A single mode planar optical waveguide comprising:
    a nonmagnetic substrate;
    a first magnetooptical layer epitaxially arranged on the substrate, said first layer having a refractive index; and
    a second magnetooptical layer epitaxially arranged on the first magnetooptical layer, said second layer having a refractive index;
    characterized in that the first and second magnetooptical layers have garnet crystal structures containing iron, said layers containing proportions of at least one substituent at dodecahedral sites in the garnet crystal structure, the proportion of the substituent in the first layer being different from the proportion of the substituent in the second layer such that the refractive index of the second layer is greater than the refractive index of the first layer in an amount from 0.001 to 0.01.

2. A planar optical waveguide as claimed in claim 1, characterized in that the substituent is lead.

3. A planar optical waveguide as claimed in claim 2, characterized in that the first and second magnetooptical layers have compositions defined by the formula $Y_{3-x}Pb_xFe_5O_{12}$.

4. A planar optical waveguide as claimed in claim 3, characterized in that:
    in the first layer, $0.007 \leq x \leq 0.025$; and
    in the second layer, $0.02 \leq x \leq 0.04$.

5. A planar optical waveguide as claimed in claim 4, characterized in that the substrate has a composition defined by the formula $Gd_3Ga_5O_{12}$.

6. A planar optical waveguide as claimed in claim 5, characterized in that the refractive indices of the first and second layers are chosen such that the waveguide will transmit only a single mode in a wavelength range from 0.8 microns to 1.6 microns.

7. A planar optical waveguide as claimed in claim 1, characterized in that the refractive indices of the first and second layers are chosen such that the waveguide will transmit only a single mode.

8. A planar optical waveguide as claimed in claim 7, characterized in that the waveguide will transmit only a single mode in a wavelength range from 0.8 microns to 1.6 microns.

9. A planar optical waveguide as claimed in claim 8, characterized in that the first and second magnetooptical layers have compositions defined by the formula $Y_{3-x}Pb_xFe_5O_{12}$.

10. A planar optical waveguide as claimed in claim 9, characterized in that:
    in the first layer, $0.007 \leq x \leq 0.025$; and
    in the second layer, $0.02 \leq x \leq 0.04$.

11. A planar optical waveguide as claimed in claim 10, characterized in that the substrate has a composition defined by the formula $Gd_3Ga_5O_{12}$.

12. A method of manufacturing a single mode planar optical waveguide, said method comprising the steps of:
    providing a nonmagnetic substrate;
    epitaxially depositing from a melt a first magnetooptical layer on the substrate, said first layer having a garnet crystal structure containing iron, said first layer containing a substituent at dodecahedral sites in the garnet crystal structure, said first layer having a refractive index; and
    epitaxially depositing from a melt a second magnetooptical layer on the first magnetooptical layer, said second layer having a garnet crystal structure containing iron, said second layer containing a substituent at dodecahedral sites in the garnet crystal structure, said second layer having a refractive index;
    characterized in that:
    the first and second layers are epitaxially deposited from the same melt;
    the substrate is rotated at a first speed of rotation during the epitaxial deposition of the first layer so as to provide the substituent in the first layer in a first proportion;
    the substrate is rotated at a second speed of rotation different from the first speed of rotation during the epitaxial deposition of the second layer so as to provide the substituent in the second layer in a second proportion; and
    the proportion of the substituent in the first layer is different from the proportion of the substituent in the second layer such that the refractive index of the second layer is greater than the refractive index of the first layer in an amount from 0.001 to 0.01.

13. A method as claimed in claim 12, characterized in that:
    the substrate has a composition defined by the formula $Gd_3Ga_5O_{12}$; and
    the layers have compositions defined by the formula $Y_{3-x}Pb_xFe_5O_{12}$.

14. A method as claimed in claim 13, characterized in that in the first layer, $0.007 \leq x \leq 0.025$.

15. A method as claimed in claim 14, characterized in that in the second layer, $0.02 \leq x \leq 0.04$.

* * * * *